3,392,745
NONFREEZABLE HYDRANT
Wayne B. Noland, Avon Lake, Iowa, assignor to Woodford Manufacturing Company, Des Moines, Iowa, a corporation of Iowa
Filed Mar. 21, 1966, Ser. No. 535,819
11 Claims. (Cl. 137—301)

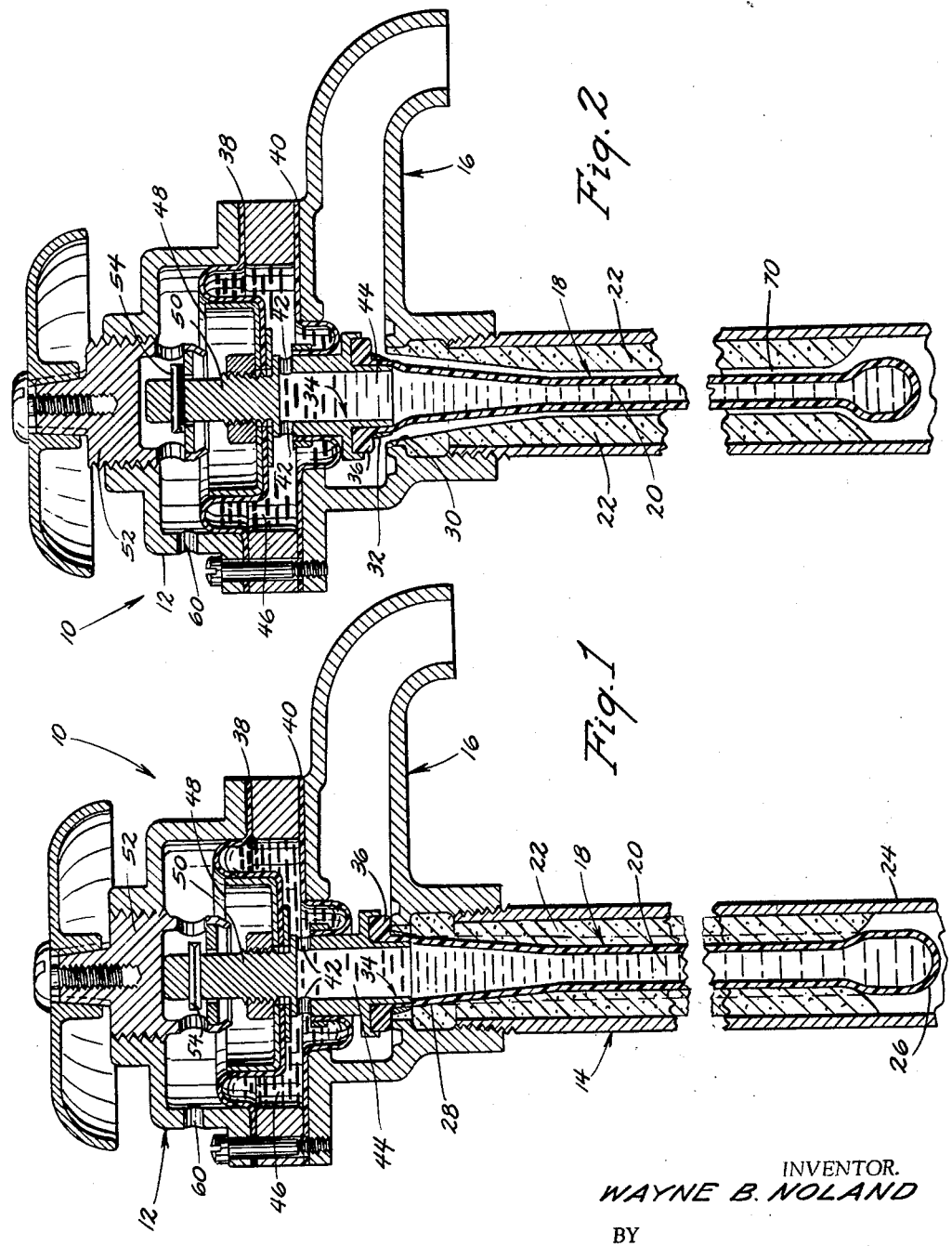

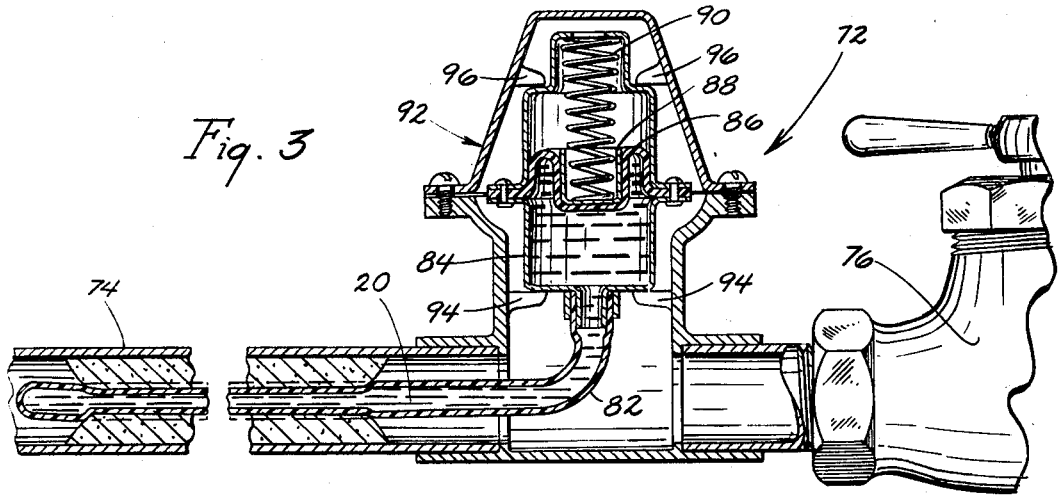
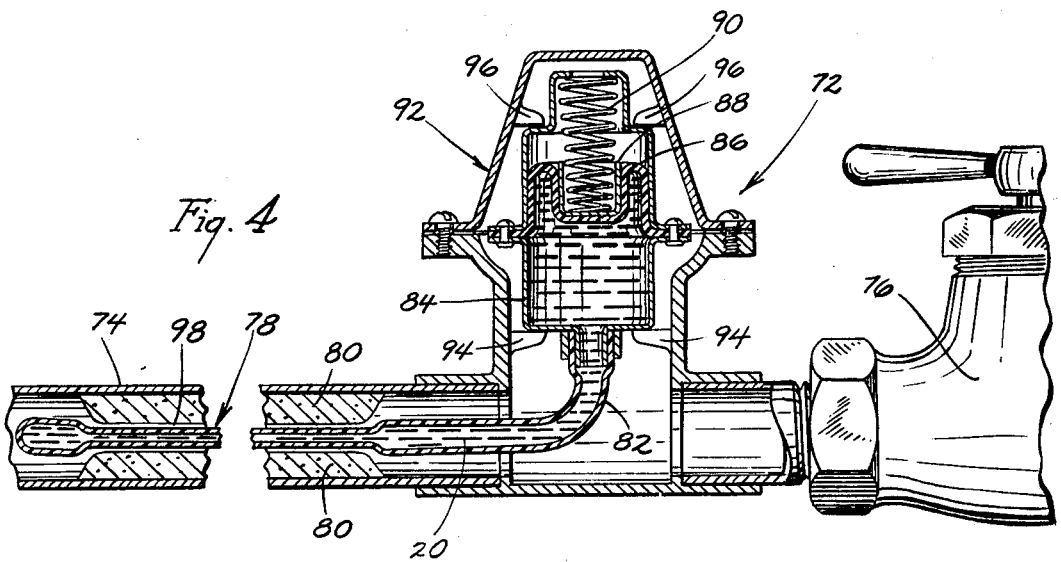

ABSTRACT OF THE DISCLOSURE

A nonfreezable hydrant having a bladder in a conduit on the inlet side of the valve and in communication with a reservoir. A piston movable in the reservoir and connected directly or through the fluid in the conduit with the valve such that when the valve is opened the fluid in the bladder moves into the reservoir and the piston is moved in its expansion stroke and when the valve is closed the pressures are placed on the piston to move it in its contraction stroke and force the nonfreezing fluid therein into the bladder.

---

The conventional water hydrants in freezing weather become inoperative since the water therein freezes solid preventing any flow of liquid from the spigot.

Therefore, this invention involves a nonfreezable type hydrant and includes a collapsible bladder filled with nonfreezing fluid which is transferred from the bladder in the water line to a reservoir when the hydrant is opened. The water pressure on the partially deflated the bladder makes a passageway between the outer peripheral surface of the bladder and the inner peripheral surface of the frozen water. The pressure in the bladder and the space it occupies may be varied by a piston associated with the reservoir. The piston may be responsive to fluid water pressure near the spigot end of the conduit and consequently when the spigot is closed the pressure is high thus forcing the nonfreezable fluid into the bladder and when the spigot is open the pressure is reduced on the piston and the nonfreezable material may flow into the reservoir whereby the bladder may collapse and consequently permit water flow around the bladder and through the conduit to the spigot. If ice is present in the conduit around the bladder the water may flow between the ice and the bladder.

A flexible diaphragm may be used to form a wall of the reservoir and cooperate with the piston. Additionally, the valve element may be pressure actuated. The valve stem may be connected to the valve element and to the piston and may be mechanically moved to a closed position. As the valve stem moves towards a closed position the piston connected to the diaphragm of the reservoir causes the bladder to be filled with the nonfreezable fluid and conversely when the valve stem is moved away from the valve seat the reservoir is enlarged in volume and the bladder fluid may under the water pressure be forced into the reservoir against the piston thereby tending to open the valve element to permit water to pass from the conduit out through the spigot. In other words, as the valve handle is moved towards the open position the water pressure on the bladder and against the valve element tends to move the valve stem, valve element and piston with the valve handle. Thus the valve is self-opening.

This invention consists in the construction, arrangements, and combination of the various parts of the assembly, whereby the purposes contemplated are attained as hereinafter more fully set forth, specifically pointed out in the claims, and illustrated in the acompanying drawings, in which:

FIG. 1 is a cross-sectional view of a hydrant having a closed valve and frozen fluid in the inlet end;

FIG. 2 is a cross-sectional view similar to FIG. 1 but showing the valve in its open position;

FIG. 3 is a fragmentary cross-sectional view of an alternate embodiment of a hydrant or faucet with frozen fluid in the inlet conduit and the valve being closed to the flow of fluid; and FIG. 4 is a cross-sectional fragmentary view similar to FIG. 3 but showing the faucet or hydrant assembly when the valve is in its open position.

The hydrant of this invention is referred to generally in FIGS. 1 and 2 by the reference numeral 10. It includes a housing 12 with an inlet conduit 14 and an outlet spigot 16.

An elongated flexible bladder 18 extends along the longitudinal axis of the inlet conduit 14. As shown in FIG. 1 the bladder 18 filled with nonfreezable fluid such as mineral oil 20 is partially deflated by water having frozen forming ice 22 which has expanded into the bladder. The outer end 24 of the conduit 14 is not subject to freezing temperatures and therefore the outer end 26 of the bladder 18 is expanded to receive some of the fluid therein.

The bladder 18 may be formed of material resistant to forming a bond with the water in either its fluid or frozen state. Such a material may be silicon rubber or the like.

The inner end 28 of the bladder 18 extends through a valve seat 30 and is secured by an annular lock element 32 to the inner end of a valve stem 34. A valve element 36 is carried on the inner end of the valve stem 34 for sealing engagement with the valve seat 30.

A pair of spaced apart flexible rubber diaphragm elements 38 and 40 are secured to the valve stem 34 on opposite sides of a plurality of port holes 42 in communication with a hollow center 44 extending from the port holes 42 to the inside of the bladder 18. The diaphragm elements 38 and 40 define a reservoir 46. A circular piston element 48 is secured to the outer end 50 of the valve stem 34 and is adapted to vary the volume of the reservoir 46 as the valve stem is moved towards and away from the valve seat 30. A rotatable handle 52 is threadably mounted in the outer face of the housing 12 and has its inner end in engagement with the outer end 50 of the valve stem 34. There is a lost motion connection between the handle 52 and the valve stem. A pin element 54 extends through the outer end 50 of the valve stem 34 to mechanically engage the handle 52 when the handle is being moved outwardly.

A vent opening 60 is provided through the housing wall 12 to communicate with the outer side of the reservoir as defined by the piston 48 and the diaphragm element 38.

In operation it is thus seen that the hydrant 10 is closed in FIG. 1 and open in FIG. 2. If the conduit 14 extends for example from within a heated building, the ice 22 will form around the filled bladder 18. The expansion of the water in freezing causes the bladder to be collapsed in the area of the ice and expanded at its end 26 and in the diaphragm elements 38 and 40 forming the reservoir 46. When it is desired to draw water from the spigot 16, the handle 52 is moved outwardly and the valve stem 34 will move the valve element 36 off the valve seat 30. The water pressure around the bladder end 26 and the pressure caused by the stretched diaphragm elements 38 and 40 will tend to further move the valve stem with the valve element toward an open position. The bladder 18 is thus further collapsed by the piston 48 being retracted and the reservoir 46 being enlarged when the valve stem 34 is moved to an open position (FIG. 2) thereby permitting water to flow through an annular passageway 70 around the bladder 18. The water may now communicate with the spigot 16 through the opening in the valve seat 30. It is also noted that the water pressure is in the process applied against the valve element 36 to cause the valve to be opened further.

When it desired to close the hydrant, the handle 52 is moved inwardly causing the outer end 50 of the valve stem to engage the handle 52 and thus the valve element 36 may be moved into engagement with the valve seat 30. In the process, the piston 48 moves through its contraction stroke thereby reducing the volume in the reservoir 46 and forcing the non freezable fluid in the reservoir 46 into the elongated bladder 18. It is to be appreciated that when the water is flowing through the conduit 14 having ice formed therein the water flow will through friction and mechanical action remove part if not all of the ice formed therein.

An alternate embodiment referred to generally by the reference numeral 72 is illustrated in FIGS. 3 and 4 and includes an inlet conduit 74 and a spigot 76. An elongated bladder 78 is disposed in the inlet conduit 74 along its center axis and as illustrated is surrounded with frozen water 80. The bladder 78 has an open ends 82 in communication with a reservoir 84. The reservoir 84 is provided with a rubber or the like flexible diaphragm 86 in one wall. A piston element 88 is disposed centrally of the diaphragm 86 and is normally urged into the reservoir 84 by a spring 90.

A housing 92 encloses the reservoir 84 and is secured to the conduit 74. A pair of inwardly extending support elements 94 are provided on the inside wall of the housing 92 to support the bottom surface of the reservoir 84. The housing 92 is watertight and the inside is in communication with the conduit 74. Water flowing around the reservoir 84 may contact the piston 88 and the rubber diaphragm 86 to assist the spring 90 in moving the piston 88 through its compression or contraction stroke. A second plurality of support elements 96 are provided at the opposite end of the housing 92 to positively hold the reservoir 80 in a stationary position.

Thus in operation it is seen that with the bladder 78 filled with nonfreezable fluid and the housing 92 being subject to nonfreezing temperatures the spigot 76 may provide water although ice 80 has formed in the conduit 74. When the faucet 76 is opened the water pressure against the piston 88 and the diaphragm 86 is reduced and the nonfreezable fluid in the bladder 78 under pressure caused by the ice 80 will force the fluid into the reservoir 84 and consequently move the piston 88 and the diaphragm wall 86 upwardly to the position of FIG. 4. Accordingly, an annular passageway 98 is formed around the elongated bladder 78 through which water may flow to the spigot 76. When the spigot 76 is closed water will accumulate in the area of the piston 88 and the diaphragm 86 thereby forcing them inwardly into the reservoir 84 and moving the nonfreezable fluid outwardly into the bladder 78.

Some changes may be made in the construction and arrangement of my nonfreezable hydrant without departing from the real spirit and purpose of my invention, and it is my intention to cover by my claims, any modified forms of structure or use of mechanical equivalents which may be reasonably included within their scope.

I claim:
1. A nonfreezable hydrant, comprising:
   a fluid conduit having an inlet end and an outlet end,
   a collapsible bladder filled with nonfreezing fluid disposed in said conduit between said inlet and said outlet,
   a reservoir in communication with said nonfreezable fluid,
   a movable piston means in said reservoir for varying the volume of said reservoir,
   actuating means for reciprocating said piston through expansion and contraction strokes for selectively inflating and deflating said bladder,
   said actuating means including a valve means disposed in said outlet of said conduit, means for opening and closing said valve means to permit flow to fluid along said bladder and out said outlet, means interconnecting said valve means and said piston such that when said valve means is opened said piston is moved in its expansion stroke and said reservoir is inflated and said bladder is deflated providing a passageway therealong for the flow of fluid in said conduit through said outlet, and when said valve means is closed said piston is moved in its contraction stroke and said reservoir is deflated with said bladder being inflated.

2. The structure of claim 1 wherein said means for interconnecting said valve means and said piston is the fluid in said conduit, and said piston means is exposed to fluid pressures in said conduit, and a valve means for selectively discharging fluid through said outlet whereby high fluid pressure on said valve means and said piston when said valve means is closed tends to inflate said bladder and relatively lower fluid pressure on said valve means and piston when said valve means is open tends to deflate said bladder.

3. The structure of claim 2 and said piston means includes a flexible diaphragm and a spring means normally urging said diaphragm through said contraction stroke.

4. The structure of claim 1 and said bladder is elongated and disposed along the longitudinal axis of said conduit with its free end extending toward the inlet opening.

5. The structure of claim 1 and the material of said bladder is resistant to bonding with water in its liquid or frozen state.

6. The structure of claim 1 wherein said means interconnecting said piston and said valve means is a valve stem whereby said valve means and valve stem move together.

7. The structure of claim 6 said valve stem of said valve unit is a hollow valve stem interconnecting and placing in communication said bladder with said reservoir, and a valve seat, and a valve element carried on said valve stem and adapted to move into and out of engagement with said valve seat.

8. The structure of claim 7 and said reservoir includes one wall defined by a flexible diaphragm, and said piston means is secured to said diaphragm.

9. The structure of claim 8 wherein said actuating means includes a manually operable handle connected to said valve stem and means for selectively moving said valve element into and out of engagement with said valve seat.

10. The structure of claim 9 wherein the connection between said handle and said valve stem is a lost motion connection whereby fluid pressure in the bladder against said piston tend to move said valve element out of engagement with said valve seat as said handle is moved away from said valve stem.

11. The structure of claim 10 and said bladder is elongated and centrally disposed in said conduit and extends toward said inlet, and the material of said bladder is resistant to bonding with water in its liquid or frozen state.

References Cited

UNITED STATES PATENTS

| 1,873,138 | 8/1932 | Mitchell | 251—5 |
| 2,886,281 | 5/1959 | Canalizo | 251—57 |
| 2,895,505 | 7/1959 | Bachus | 251—5 X |

FOREIGN PATENTS 267,763   11/1913   Germany.
1,041,313  10/1958  Germany.

M. CARY NELSON, *Primary Examiner.*

A. ROSENTHAL, *Assistant Examiner.*